UNITED STATES PATENT OFFICE.

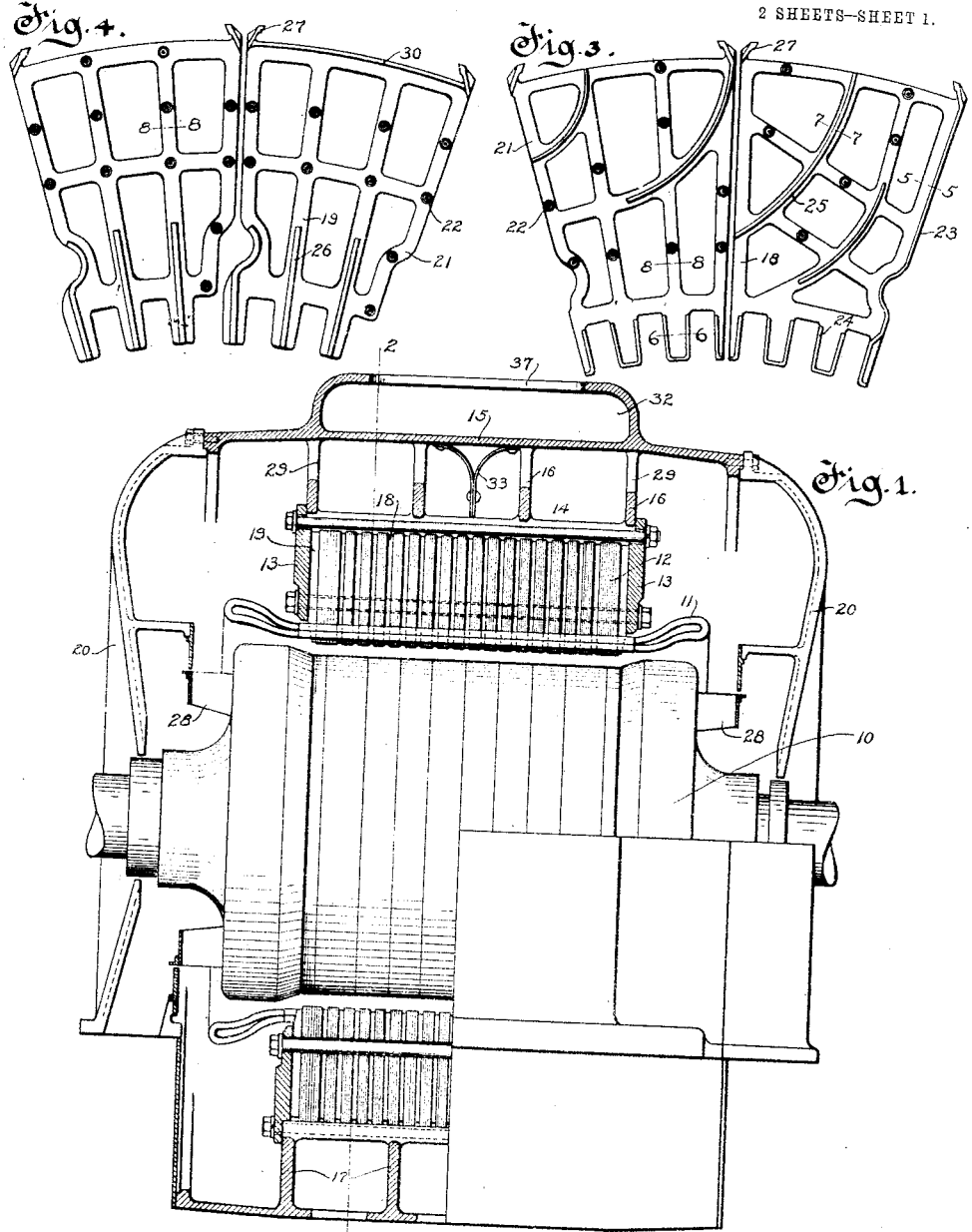

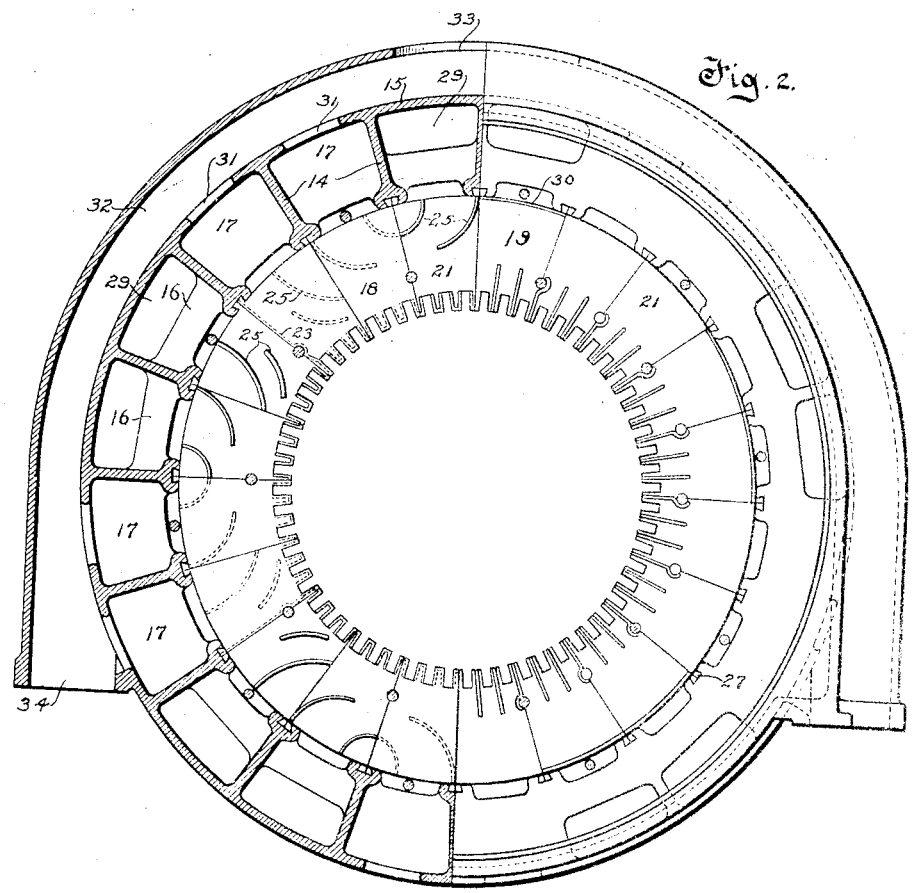

ROBERT B. WILLIAMSON, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,085,514. Specification of Letters Patent. Patented Jan. 27, 1914.

Application filed November 21, 1910. Serial No. 593,358.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Dynamo-Electric Machines, of which the following is a full, clear, and exact specification.

My invention relates to dynamo-electric machines, and particularly to the ventilation thereof.

The proper ventilation of dynamo-electric machines is one of the most difficult problems of the designer.

In many modern machines, such as high speed turbo alternators, it is necessary that enormous volumes of air be forced through the various ventilating ducts, often at high speeds. In order to get the proper cooling effect, the path of the air in contact with the heated parts of the machine should not be too long, the air currents should not form swirls or eddies, and the friction caused by the passage of the air through the machine should be a minimum.

It is the object of my present invention to accomplish these results in a satisfactory manner.

In carrying out my invention the stator core is provided with a number of circumferential spaces, formed by spacing plates. These spacing plates have substantially radial partitions which divide each circumferential space into any desired number of parts. They also have baffles which guide air supplied to certain parts of the periphery of the stator core first inward toward the stator windings and then outward to other parts of the periphery of the stator core, which preferably alternate in position with the first named parts thereof and are connected to outlet passages. Air is preferably supplied to the first named parts of the periphery of the stator core by fans located at both ends of the rotor structure. Means is preferably provided for preventing the air supplied from the periphery to the spaces in the stator core from passing inward into the air gap between the stator and rotor, while preferably any air which may be supplied to such air gap from other sources is allowed to pass outward through the spaces associated with the stator core.

The various novel features of my invention will appear from the description and drawings, and will be particularly pointed out in the claims.

Figure 1 is a longitudinal section through a dynamo-electric machine embodying my invention; Fig. 2 is an end view with the end cover and end plate removed, and with the left hand half in section substantially on the line 2—2 of Fig. 1; Figs. 3 and 4 show two forms of ventilating segments used; and Figs. 5, 6, 7, and 8 are cross-sections on the lines 5—5, 6—6, 7—7, and 8—8 respectively of Figs. 3 and 4.

The rotor 10 is of any desired or usual structure. The stator comprises windings 11 located in slots in a laminated core 12. This core is clamped between end plates 13, is supported on the inner ends of a number of radial ribs 14 extending inwardly from the stator housing 15 and braced by cross-ribs 16 and 17, and is provided with a number of circumferential spaces formed by the spacing plates 18 and 19, as shown in Figs. 3 and 4 respectively. The housing 15 has the usual end covers 20. The ribs 14, 16, and 17 form a number of chambers arranged around the periphery of the stator core. The spacers 18 are used between parts of the laminated core 12, while the spacers 19 are preferably used only at the ends of the core between the latter and the end plates. Each spacer, of either kind, is formed of a flat skeleton backing plate 21, from one side of which project spacing buttons 22 (see Fig. 8) and ribs of the same height as the buttons. The height of the buttons and ribs is large as compared with the thickness of the backing plate. There are several varieties of the ribs. On the spacers 18, some form the substantially radial dividing partitions 23 to divide the circumferential spaces formed by the spacers 18 into parts; others form the barriers 24 which fit closely to the stator winding and prevent air from passing from the circumferential spaces in the stator core to the air gap between the rotor and the stator; and the remainder form baffles 25 which guide the supplied air from certain parts of the periphery of the stator core first inward to the stator windings and then outward to other and preferably adjacent parts of the periphery of the stator core. On the spacers 19 there are the radial ribs 26, and on some of them the barriers 30, of which more will be said hereafter. The spacers or spacing segments may each be made of one part if desired, but for facility in manufacture they are preferably formed of a plurality of parts, two being illustrated.

In building up the machine the laminæ and the spacers are put in place in the usual fashion, being fastened by the dove-tail fingers 27. In putting the spacing segments in place alternate segments are faced oppositely, so that the ribs and buttons on one segment are upward while those of the next are downward, as is clear from Fig. 2. This opposite facing is done merely to avoid the necessity of having right and left hand spacers 18; if such are provided the opposite facing is unnecessary.

In the operation of the machine air is thrown outward by the fans 28 on each end of the rotor 10, and is guided by the end covers 20 through openings 29 in the cross-ribs 16 to certain parts of the periphery of the stator core or into the chambers between the cross-ribs 16. Thence it passes into the spaces formed by the spacers 18, preferably being guided by plates 33; but it is prevented from passing into the spaces formed by the spacers 19 by barriers 30 on those of such latter spacers which are adjacent to the ribs 16. The air cannot pass circumferentially around the periphery of the stator core because of the radial ribs 14. Having passed into the intermediate circumferential spaces in the stator core, the air is guided by the baffles 25 inward to the stator windings 11, flows circumferentially around the machine to the respective adjacent and oppositely faced segments 18, and is then guided outward by similar baffles 25 on said latter segments to the periphery of the core and into the chambers between the cross-ribs 17. Further circumferential flow of the air in the circumferential spaces is prevented by the partitions 23. Having passed into the chambers between the ribs 17, the air then passes outward through openings 31. These openings may lead directly to the atmosphere, but preferably lead into an outer chamber 32 which conducts the air to any suitable discharge opening, preferably either at the top of the machine or at the bottom. As shown, the chamber 32 is open at the top through opening 37, and also at the bottom, through openings 34 in the housing pedestal. Any air which may get into the air gap between the stator and the rotor may escape into the spaces formed by the spacers 19, which spaces are open to the chambers between the ribs 17. If desired, the barriers 24 on those of the spacers 18 which are adjacent to the cross-ribs 17 may be omitted, so that the outward flow of air from the air gap into the intermediate spaces is also permitted.

Many modifications may be made in the precise arrangement shown and described, and all such which do not involve a departure from the spirit and scope of my invention I aim to cover in the following claims.

What I claim as new is:

1. In a dynamo-electric machine, the combination of a laminated stator core, and segmental spacing plates formed each of a backing plate with projections from one side, said spacing plates being arranged in one or more circles between laminæ of the core with some segments in each circle faced one way and some the other.

2. In a dynamo-electric machine, the combination of a stator core, means for supplying air under pressure to a plurality of angularly separated parts of the periphery of the core, and spacing plates which provide one or more circumferential spaces in the core, said spacing plates each being provided with projections on one side and being arranged in one or more circles in said circumferential spaces with some segments in each circle faced one way and some the other, the projections on the spacing plates forming baffles which guide the air supplied to the periphery of the core first inward and then outward between the same laminæ.

3. In a dynamo-electric machine, the combination of a rotor, a stator core provided with a plurality of ventilating passageways, some of said ventilating passageways being open at the outer periphery of the stator core and closed to the air gap between the rotor and stator cores, and others of said ventilating passageways being open to the air gap between the rotor and the stator core, means for supplying air to certain parts of the outer periphery of the stator core, means for guiding such air through the ventilating passageways open to such parts of the outer periphery to other parts of said periphery, and means for obstructing the direct passage of such air from the first mentioned parts to the second mentioned parts of said periphery.

4. In a dynamo-electric machine, the combination of a rotor, a stator core provided with a plurality of ventilating passageways, some of said ventilating passageways being open to the outer periphery of the stator core and closed to the air gap between the rotor and stator cores, and other of said ventilating passageways being open to the air gap between the rotor and stator core, means for supplying air to certain parts of the outer periphery of the stator core, other parts of such periphery being open to the atmosphere, and closed to the direct passage of air from the first mentioned parts of such periphery.

5. In a dynamo-electric machine, the combination of a rotor, a stator core having ventilating passageways open to the outer periphery of the stator core, means for closing intermediate ones of said passageways to the air-gap between the rotor and stator cores, and means for causing a circulation of ventilating fluid through said passageways from one portion of the outer periphery of the stator core to another portion thereof and from said air-gap through end ones of said passageways to the outer periphery of the stator core.

6. In a dynamo-electric machine, in combination with a laminated stator core, spacing means between adjacent laminations of said core provided with guiding means for forming a passageway between said laminations from one circumferential point of said core to another, and with further means for obstructing a passageway between said laminations from the outer periphery of said core to the inner periphery thereof.

7. A spacing device for core laminations, comprising a segmental body portion provided with a projection forming a barrier at one radial edge, and with guiding projections extending the same distance from said body portion as said barrier to form a passage from the outer periphery to the opposite radial edge.

8. A spacing device for core laminations, comprising a segmental body portion provided with a projection forming a barrier at one radial edge, and with guiding projections to form a passage from the outer periphery to the opposite radial edge.

Milwaukee, Wis., Nov. 15, 1910.

In testimony whereof I affix my signature, in the presence of two witnesses.

ROBERT B. WILLIAMSON.

Witnesses:
 CHAS. L. BROWN,
 G. B. SCHLEY.